United States Patent [19]

Kalmanides et al.

[11] Patent Number: 5,613,607
[45] Date of Patent: Mar. 25, 1997

[54] PRODUCT HOLDING AND DISPLAYING CONTAINER

[75] Inventors: Dan Kalmanides, Orange; Richard M. Ellison, Huntington, both of Conn.

[73] Assignee: Inline Plastics Corporation, Milford, Conn.

[21] Appl. No.: 382,999

[22] Filed: Feb. 3, 1995

[51] Int. Cl.[6] .................................................. A45C 11/20
[52] U.S. Cl. .......................... 206/467; 206/461; 206/551; 229/906; 220/298
[58] Field of Search ................................. 206/551, 467, 206/468, 461; 229/906; 220/300, 301, 302, 298, 574

[56] References Cited

U.S. PATENT DOCUMENTS

| | | | |
|---|---|---|---|
| 1,746,926 | 2/1930 | Boyle, Jr. | 220/300 |
| 2,036,572 | 4/1936 | Frost | 229/406 |
| 2,071,266 | 2/1937 | Schmidt . | |
| 2,241,381 | 5/1941 | Hothersall | 220/301 |
| 2,675,040 | 4/1954 | Raun et al. | 220/298 |
| 3,303,964 | 2/1967 | Luker | 229/406 |
| 3,371,817 | 3/1968 | Gasbarra et al. | 220/298 |
| 3,645,758 | 2/1972 | MacManus . | |
| 4,136,799 | 1/1979 | Albert | 220/298 X |
| 4,197,940 | 4/1980 | DeRossett . | |
| 4,279,355 | 7/1981 | Schwartz et al. | 220/300 |
| 4,449,984 | 5/1984 | Cruz | 220/298 X |
| 4,452,356 | 6/1984 | Dahl | 206/45.32 |
| 4,705,163 | 11/1987 | James . | |
| 4,867,303 | 9/1989 | Beckerman et al. | 229/406 |
| 5,320,233 | 6/1994 | Welch | 220/300 |

Primary Examiner—Paul T. Sewell
Assistant Examiner—Tara L. Laster
Attorney, Agent, or Firm—Melvin I. Stoltz

[57] ABSTRACT

A unique, multi-purpose, reusable and disposable product holding and displaying container system is achieved by providing a base member which incorporates locking means and a product display member which comprises a product holding zone and locking means constructed for rapid engagement and disengagement with the locking means of the base member. In the preferred embodiment, the product holding and displaying container system is formed from thermoformed or vacuum-formed plastic material, and is constructed to hold any desired product, particularly, baked goods and rack or hook display items. In one embodiment, the container system is constructed for being completely separated from any support panel, thereby providing a container which is easily reused for product storage until the product is fully consumed.

25 Claims, 7 Drawing Sheets

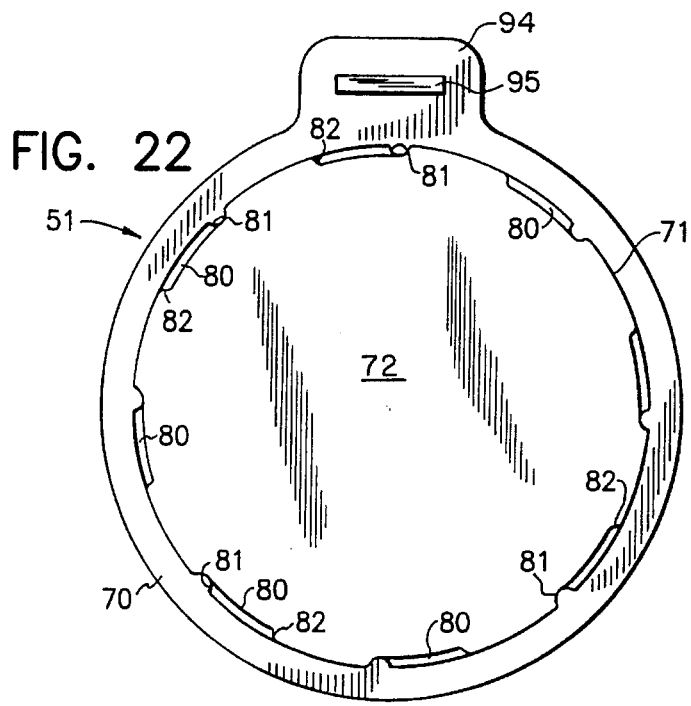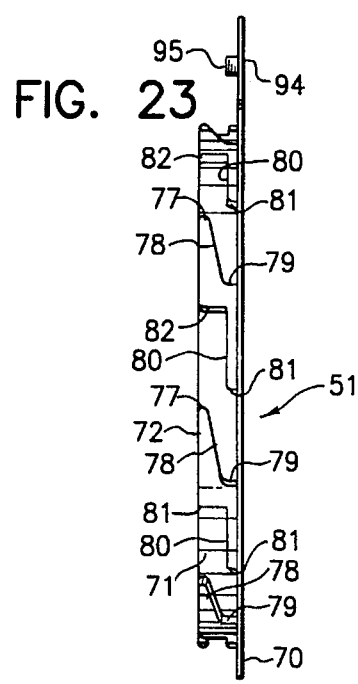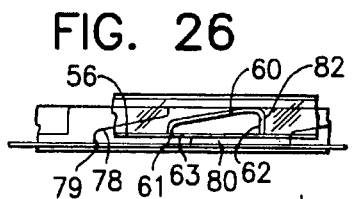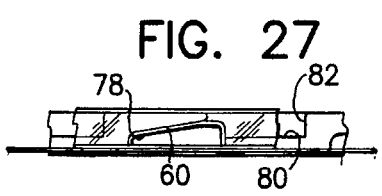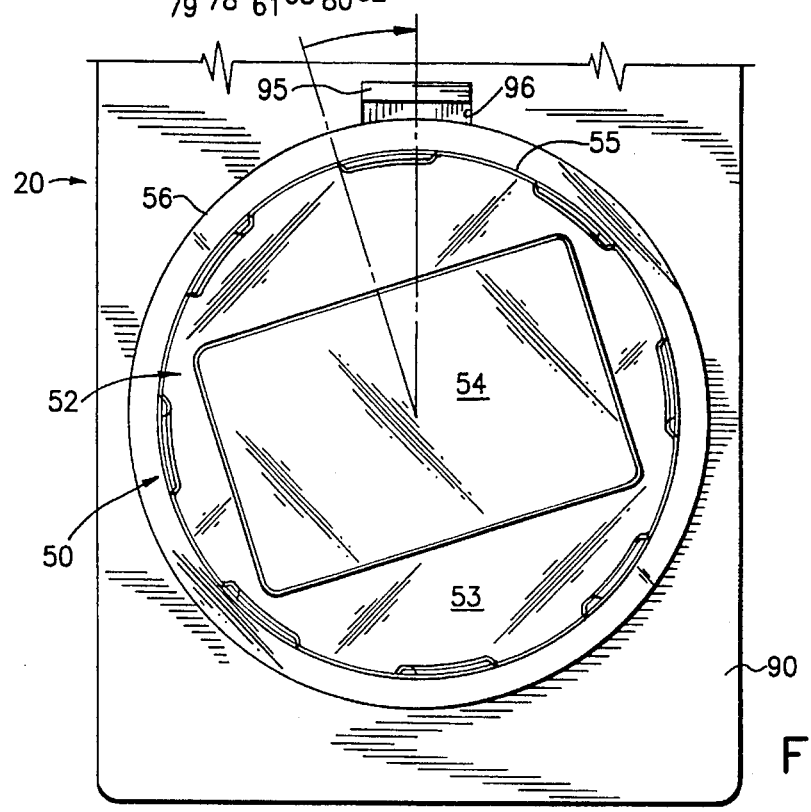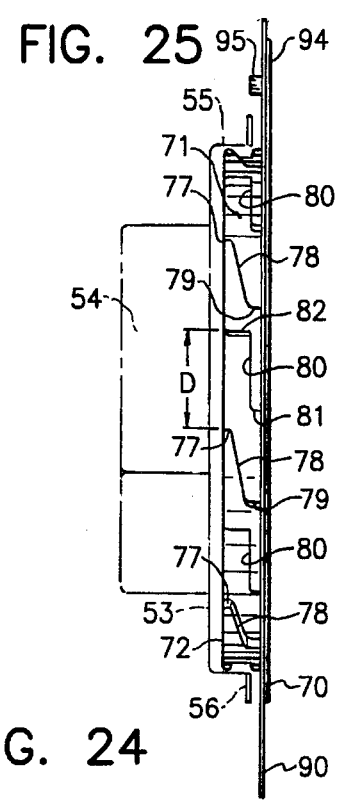

PRODUCT HOLDING AND DISPLAYING CONTAINER

TECHNICAL FIELD

This invention relates to product holding and displaying containers and, more particularly, to two-piece container systems which are constructed for ease of engagement and disengagement.

BACKGROUND ART

One of the problems manufacturers of a wide variety of products are consistently faced with is the type of container in which the products are to be placed for sale and distribution to the customers. Although the products being distributed to consumers is widely diverse, including small to large manufactured products, components, assemblies, and subassemblies, as well as a wide variety of consumable or edible products, particularly baked goods, the problems faced by the manufacturer of these diverse products are similar.

Typically, manufacturers wish to have their products in a sealed or securely locked container to prevent theft, while also incorporating a product holding portion which is transparent, to allow the consumer to see the product being purchased. In addition, the container must also be inexpensive and preferably formed of recyclable material. Generally, prior art containers are formed by employing either entirely or, in part, thin plastic material which is thermoformed or vacuum-formed into the desired shape, since both of these processes provide products which are inexpensive.

In general, the size and shape of products typically sold in container systems of this general nature is widely varied. However, the container systems employed by most manufacturers are similar. These prior art systems typically comprise blister packages, wherein a transparent plastic member is formed in a desired size and shape and securely affixed to a supporting card. Although blister packages are very popular and widely used, they suffer from a complete inability of enabling the consumer to easily reuse the package for storage, once the package has been opened.

In an alternate prior art construction, a two-piece container is employed which is formed in a clamshell-type structure wherein one container piece is affixed to the other container piece along one edge, which forms a pivot interconnected between the two cooperating pieces. The three free edges of the two cooperating members incorporated lock means for securely affixing the two members together once the desired product has been positioned therein. Packaging of this nature is quite popular and is used for a wide range of products including manufactured products and bakery items.

One advantage of the clamshell type structure is its ability to incorporate a lock system which allows the container to be reused, thereby enabling the consumer to store unused portions of the product in the container after the container has been opened. However, the locking systems employed are often hard to use, causing the container or the product to be damaged during the opening process. In addition, in many instances, products are sold in clamshell structures wherein the clamshell members are securely bonded to each other, by means such as ultrasonic or heat to prevent store theft. This construction, however, also prevents the container from being reused, once the container has been opened.

In the sale and distribution of most products, other than food products, the containers employed for holding the products being sold are conventionally sealed, in order to prevent unwanted pilferage prior to purchasing. As a result, the containers for these products are usually incapable of being reused by a consumer once the product has been purchased. Consequently, the consumer must buy another storage container for retaining the product after it has been purchased, or retaining the unused portion of the product, when a plurality of products are purchased together.

In the sale and distribution of food products, one-piece or two-piece containers have been commonly used for the sale and distribution of a wide variety of food products. Typically, containers are thermoformed or vacuum formed from either clear plastic material or thermally insulated material, such as styrofoam and are constructed with a two-piece interlocking system or a clamshell construction wherein the integrally hinged components are interlockable.

Although these type of containers have proven to be effective for most food items for which they are used, it has been found that these prior art container systems are completely ineffective for satisfying consumer needs in regard to many products, particularly frosted baked goods. Due to the locking system employed in these containers, frosted baked goods are often jarred or damaged during the opening and closing of the container system. Although this problem exists with most containers, this problem is most acute with containers for frosted or decorated layer cakes, which often have the decorations or frosting on the cake damaged or marred when the consumer attempts to separate the components forming the container.

Therefore, it is a principal object of the present invention to provide a two-piece product holding and displaying container system which is quickly and easily lockable into a unitary structure, while also being completely reusable by the consumer after purchasing.

Another object of the present invention is to provide a product holding and displaying container system having the characteristic features described above which can be repeatedly opened and closed by the consumer with ease, assuring storage of the product whenever desired, without damaging the product.

Another object of the present invention is to provide a product holding and displaying container system having the characteristic features described above wherein the two interlocking components forming the container system are quickly and easily telescopically engaged with each other and easily interlocked with each other by arcuate rotation.

Another object of the present invention is to provide a product holding and displaying container system having the characteristic features described above which is capable of being employed for holding multi-layer, frosted bakery products, particularly layer cakes, and providing ease of access to the cake without disturbing the frosting or decorations appearing thereon.

Another object of the present invention is to provide a product holding and displaying container system having the characteristic features described above which is inexpensive to manufacture and can be made entirely from recyclable material.

Another object of the present invention is to provide a product holding and displaying container system having the characteristic features described above which is completely disposable when the product has been entirely used.

Other and more specific objects will in part be obvious and will in part appear hereinafter.

SUMMARY OF THE INVENTION

By employing the present invention, all of the difficulties and drawbacks found in the prior art constructions are eliminated and an easily employed, interlocking, reusable product holding and displaying container system is realized. In addition, the container system of this invention is manufacturable comparatively inexpensively, thereby being fully disposable when its use is no longer desired. Furthermore, the container systems may be made from recyclable material, thereby being friendly to the environment.

In accordance with the present invention, one member of the container system comprises a supporting base which incorporates locking means positioned for cooperative interengagement with the second member. In addition, the second member comprises a display member which incorporates cooperating locking means for mating, interengagement with the support base. By employing these two members in the manner detailed herein, a unique, product holding and displaying container system is realized.

Prior to the present invention, thermoformed or vacuum-formed plastic containers were incapable of providing a multi-purpose, readily reusable, interlockable product holding and displaying container system as attained by the present invention. In order to attain a multi-purpose, reusable system, glass, metal, or molded plastic components were required. Containers of this nature are substantially more expensive to manufacture and are unable to function effectively as single or short-term use, disposable products. However, by employing the teaching of the present invention, a product holding and displaying container inexpensively formed by thermoformed plastic components is realized and the previously unattainable goals are reached.

As discussed above, the only type of thermoformed or vacuum-formed plastic containers presently marketed for product holding and displaying container systems comprise blister packages which are sealed to a support panel, typically a cardboard backing member, for securely retaining the product for display and distribution. However, reuse for such container systems is not realistically attainable.

The only alternate construction that has been realized for such prior art systems is the clamshell or hinged container system, the components of which are often integrally sealed together to prevent reuse of the container system once the container has been opened to gain access thereto. Alternatively, locking tabs, lugs, or bosses are employed, which are difficult to open or close. Consequently, the prior art systems have been incapable of providing an inexpensive thermoformed or vacuum-formed plastic container system which is commercially saleable as a single or short term use system which is disposed after use.

In addition, by employing the present invention, the product holding and displaying system is also capable of providing, if desired, either integrally formed or cooperatively associated means for enabling the entire container system to be placed on a peg or holding hook for ease of sale and display, for the various products distributed in this manner. In one embodiment, the base member also incorporates an integrally formed enlarged support plate for enabling the entire container system to be mounted on a peg or hook for ease of sale and distribution. In an alternate embodiment, the two component holding and displaying container system of the invention is constructed for cooperative, interlocked interengagement with a generally conventional card member for supporting the product holding and displaying container system for presentation on a hook or peg display.

In the embodiment of the present invention specifically constructed for food products, a unique and highly advantageous food holding and displaying container system is realized. By employing the present invention, an easily employed, two-component locking and unlocking container system is realized which is capable of accommodating a wide variety of products, including products which require careful handling.

As discussed above, products such as frosted baked items, particularly multi-layer decorated cakes, are now capable of being retained in a product holding and displaying container system which can be repeatedly easily opened for complete access to the product and then lockingly closed for product storage and retention. Furthermore, when the cake has been consumed, the container system is fully disposable.

In the present invention, the mating, interengageable locking system allows the displaying portion of the container system to be positioned peripherally surrounding the product and then telescopically placed into contacted engagement with the supporting base of the system. Then, by merely pivoting the display member through an acute arcuate angle, the locking means of the components are brought into secure interengagement with each other, assuring interlocked product retention. Similarly, in order to gain access to the product, the process is reversed, allowing the displaying member to be easily disengaged from the base member for removal.

The invention accordingly comprises an article of manufacture, possessing the features, properties, and relation of elements which will be exemplified in the article hereinafter described and the scope of the invention will be indicated in the claims.

THE FIGURES

For a fuller understanding of the nature and objects of the invention herein described, reference should be had to the following detailed description taken in connection with the accompanying drawings, in which:

FIG. 22 is a front view of the base member of the container system of FIG. 19;

FIG. 23 is a side elevation view of the base member of FIG. 22;

FIG. 24 is a front view of the product holding and display container system depicted in telescopic interengagement prior to being rotated into locked interengagement;

FIG. 25 is a side elevation view of the product holding and display container system of FIG. 24;

FIG. 26 is a side elevation view, partially in cross section and partially broken away, depicting the product holding and display container system as shown in FIG. 24; and FIG. 27 is a side elevation view, partially in cross section and partially broken away, depicting the product holding and display container system as shown in FIG. 19.

DETAILED DESCRIPTION

Figure 1:
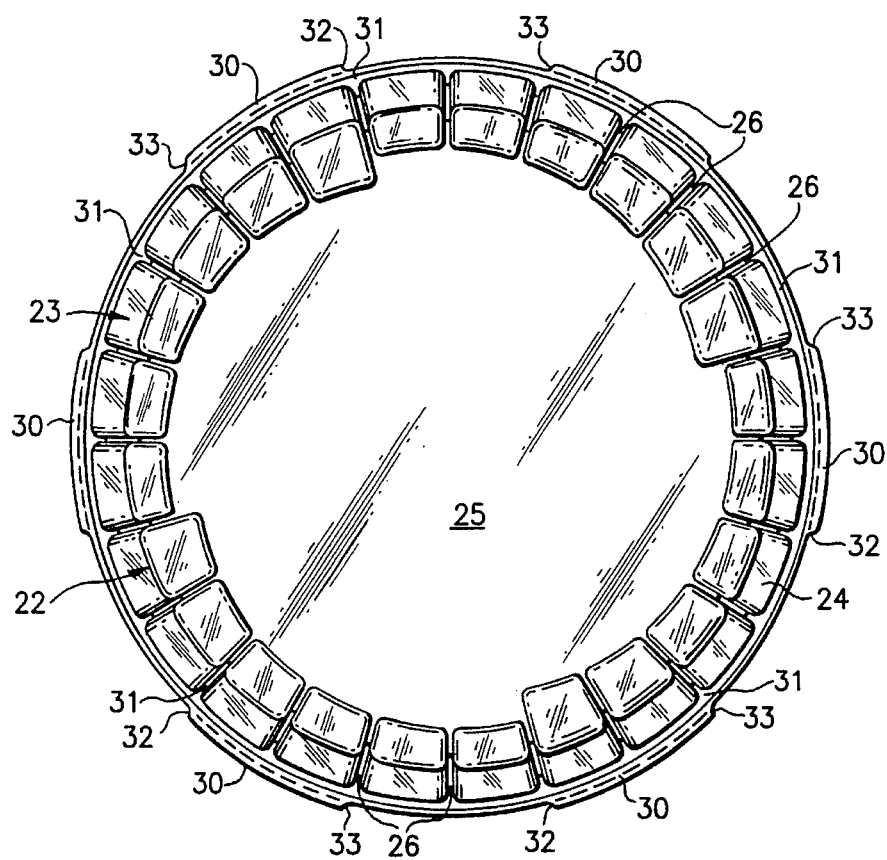
FIG. 1 is a top plan view of one embodiment of the product holding member of the dual component, interlockable, reusable product holding and displaying container system of the present invention.

By referring to FIGS. 1–27, the construction and operation of the preferred embodiments of the present invention can best be understood. In these figures, preferred alternate constructions of the present invention are fully detailed and discussed herein. However, it is to be understood that these embodiments are merely examples, and alternate embodiments can be made without departing from the scope of the present invention.

In FIGS. 1–9, one embodiment of the present invention for use with food products is fully detailed. In the embodiment depicted, the present invention is employed for securely retaining and displaying a multi-layer frosted cake. This embodiment is selected as exemplary of the present invention for use with food products, since multi-layer frosted cakes are typically the most difficult product for prior art systems to handle without unwanted damage or marring occurring to the cake surface.

As shown in these figures, product holding and displaying container system 20 of the present invention comprises a supporting base member 21 and a cooperating product display member 22. Both members 21 and 22 are formed from thin plastic material by thermoforming or vacuum forming. Although thermoformed and vacuum formed plastic members are conventional, no prior art system has been able to achieve a container system which is easily used for secure locking engagement, while also being inexpensive and fully disposable when use is completed.

In this embodiment, product display member 22 comprises a closed end, substantially cylindrically shaped, one-piece housing 23, which incorporates a generally cylindrically shaped, peripherally surrounding wall 24 terminating with a substantially flat top panel 25. Preferably, substantially continuous, peripherally surrounding wall 24 incorporates a plurality of stiffening ribs 26 spaced thereabout to provide wall 24 with increased strength and rigidity.

In order to enable a consumer to readily see the frosted layer cake for which product display member 22 is constructed to retain, housing 23 of product display member 22 is preferably formed from transparent plastic material and incorporates a substantially enlarged flat zone in top panel 25 to enable consumers to easily view the cake retained within product holding and display container system 20. In addition, ribs 26 are preferably formed with wide and fairly flat or smooth surfaces to further enhance the visibility of the product retained therein. In this way, a consumer is able to easily view the product retained within product holding and display container system 20 for selecting the precise product desired.

Peripherally surrounding wall 24 of housing 23 is integrally interconnected with top panel 25 along one edge thereof, forming an internal retaining zone 28, and defining an entry or portal zone 29 at its opposed end. By employing portal entry zone 29, access to holding or retaining zone 28 is easily achieved.

As shown in FIGS. 1–3 and 7, product display member 22 is preferably constructed with side wall 24 terminating with an integrally formed, substantially U-shaped channel 31 which extends substantially the entire circumference of side wall 24, peripherally surrounding and defining entry zone 29. The construction of product display member 22 is completed by incorporating a plurality of radially extending spaced flanges 30 peripherally surrounding entry portal 29 and extending from the free edge of U-shaped channel 31. As is fully detailed below, flanges 30 are constructed for mating, interlocking interengagement with base member 21.

By employing U-shaped channel 31, added rigidity is provided to product display member 22. It has been found that although U-shaped channel 31 can be eliminated, with flanges 30 extending from side wall 24, the incorporation of U-shaped channel 31 strengthens the overall construction of product display member 22, enhancing its use and locking interengagement with base member 21.

In the preferred construction, six substantially identically-shaped flanges 30 are formed on product display member 22, with each of the flanges 30 being equally spaced apart from each other. In addition, each flange 30 comprises a ramped or sloped construction and incorporates a leading edge 32 and a trailing edge 33.

In order to provide a cooperating, product supporting interlocked receiving component for product display member 22, product holding and displaying container system 20 incorporates base member 21. By referring to FIGS. 2, 4, and 5, along with the following detailed disclosure, the construction and operation of base member 21 can best be understood.

In the preferred embodiment, base member 21 incorporates a base plate 36 which is formed in a substantially circular shape having a diameter greater than the diameter of U-shaped channel 31 of product display member 22. In addition, base member 21 incorporates an upstanding sidewall 37 which peripherally surrounds base plate 36 substantially in its entirety, defining an upstanding outer wall for base member 21. Preferably, radially extending tabs 38, 38 are mounted to upstanding sidewall 37 at diametrically opposed locations, for assisting in holding and handling base member 21 during cooperative, interlocking interengagement with product display member 22.

In the preferred embodiment, base plate 36 of base member 21 incorporates a plurality of concentrically arranged circular grooves 34 formed therein in order to add strength and rigidity to base plate 36. In addition, base plate 36 also incorporates an upstanding circular shaped stabilizing ring 35 positioned between grooves 34 and upstanding sidewall 37. Stabilizing ring 35 is employed to further strengthen base plate 36 for possessing the desired inherent strength to support the cake placed thereon.

In addition, stabilizing ring 35 preferably has a diameter slightly greater than the diameter of the plate on which the cake retained by product holding display container 20 is positioned. As a result, stabilizing ring 35 assures the cake placed therein is maintained in the desired position, with stabilizing ring 35 peripherally surrounding the cake supporting plate and maintaining the cake with its supporting plate in the precisely detailed location on base plate 36.

Figure 4:
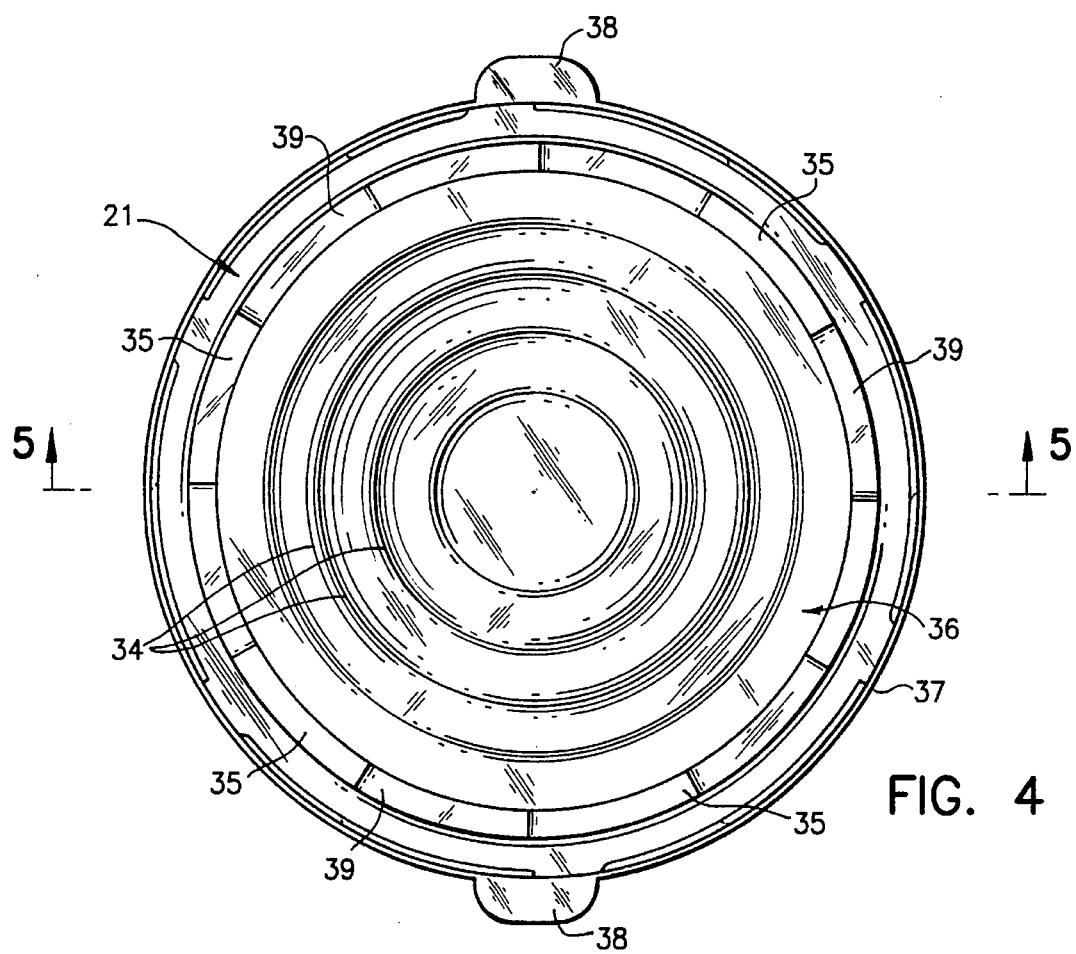
FIG. 4 is a top plan view of the base member depicted in FIG. 2.
Figure 5:
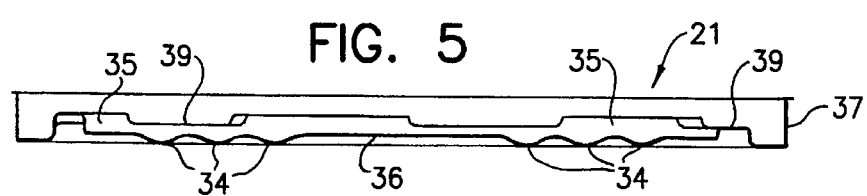
FIG. 5 is a cross-sectional side view of the base member taken along line 5—5 of FIG. 4.

As shown in FIGS. 4 and 5, in the preferred construction, stabilizing ring 35 comprises an upwardly extending height which extends beyond the height of the cake supporting plate associated therewith, in order to assure peripherally surrounding holding engagement of the cake supporting plate. In addition, a plurality of height reduced zones 39 are formed in stabilizing ring 35 and have a vertical height less than the height of the dish on which the cake is placed. In this way, access to the cake retaining plate is easily achieved for removing the cake and plate from base member 21.

In order to provide base member 21 with locking means for cooperative, secure, holding interengagement with product display member 22, base member 21 incorporates a plurality of substantially identically shaped flange engaging and locking ledges 40 formed in sidewall 37, radially extending inwardly therefrom for cooperative interengagement with radially extending flanges 30 of product display member 22. In order to assure the secure, rapid, easy, interlocked interengagement of product display member 22 with base member 21, flange engaging and locking ledges 40 are spaced equidistant about the entire circumference of upstanding sidewall 37. Preferably, six separate and independent ledges 40 are formed about upstanding sidewall 37, for receiving and lockingly interengaging the six separate and independent flanges 30 formed on product display member 22. This cooperative interlocking engagement is best understood by also referring to FIGS. 6–9, along with the following detailed disclosure.

In the preferred construction, each flange engaging and locking ledge 40 comprises a surface extending inwardly from upstanding sidewall 37 a distance ranging between about 0.030 and 0.125 inches. Of course, this distance can be varied and depends upon the extending width of flanges 30. In addition, each ledge 40 is ramped, sloping at an acute angle relative to base 36. Although the overall length of each flange engaging and locking ledge 40 depends upon the desired number of ledges employed in the overall construction, as well as the length of flanges 30, a length of between about 2.25 and 2.75 inches has been found to provide the greatest efficacy and operation ease. Similarly, each flange 30 comprises a length slightly less than the length of ledge 40.

In addition, in the preferred embodiment, each flange engaging and locking ledge 40 incorporates an abutment stop 41 formed at the end of ledge 40 closest to base plate 36 for contacting leading edge 32 of flange 30, preventing further arcuate movement of flange 30 relative to ledge 40. In addition, ledge 40 also incorporates a locking tab 42 formed at the opposed end of ledge 40 for securely retaining the trailing edge 33 of flange 30 when flange 30 is fully rotationally engaged with ledge 40. As is apparent from FIGS. 2, 5, 7, and 9, abutment stop 41 is formed at the end of ledge 40 which is closest to base plate 36, while locking tab 42 is formed at the opposed end of ledge 40 which is spaced furthest away from base plate 36.

In the preferred construction, base member 21 also incorporates a plurality of separate and independent cam surfaces 43 formed on upstanding sidewall 37 in juxtaposed spaced cooperating relationship with flange engaging and locking ledges 40. In the preferred embodiment, each cam surface 43 extends radially inwardly from upstanding sidewall 37, spaced above and substantially parallel to a flange engaging and locking ledge 40. Cam surface 43 is formed with a slope angle substantially equivalent to the slope angle of flange engaging and locking ledge 40, thereby providing a guiding and camming surface for flanges 30 of product display member 22.

In the preferred embodiment, each cam surface 43 comprises an overall length greater than the length of flange engaging and locking ledge 40, with its upper end directly adjacent the free edge of sidewall 37 and its opposed edge positioned substantially adjacent, or slightly below, the upper edge of flange engaging and locking ledge 40 at which abutment locking tab 42 is formed. As is more fully detailed below, this construction is preferred in order to assure that radially extending flanges 30 of product display member 22 are each individually guided towards flange engaging and locking ledge 40 as the product display member 22 is rotated in the desired direction for locking interengagement with base member 21.

Figure 2:
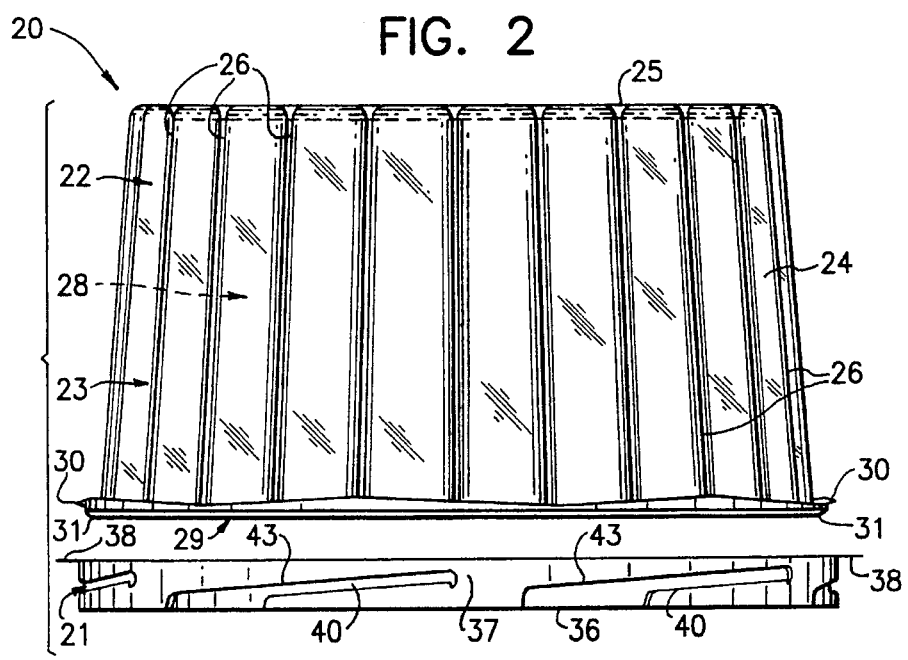
FIG. 2 is an exploded side elevation view of the interlockable, reusable product holding and display container system of FIG. 1 showing the telescopically interengageable base member and product holding member separated from each other.
Figure 3:
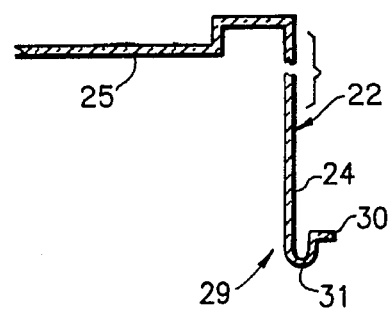
FIG. 3 is a cross-sectional side elevation view, partially broken away, of the product holding member of the container system depicted in FIG. 2.
Figure 6:
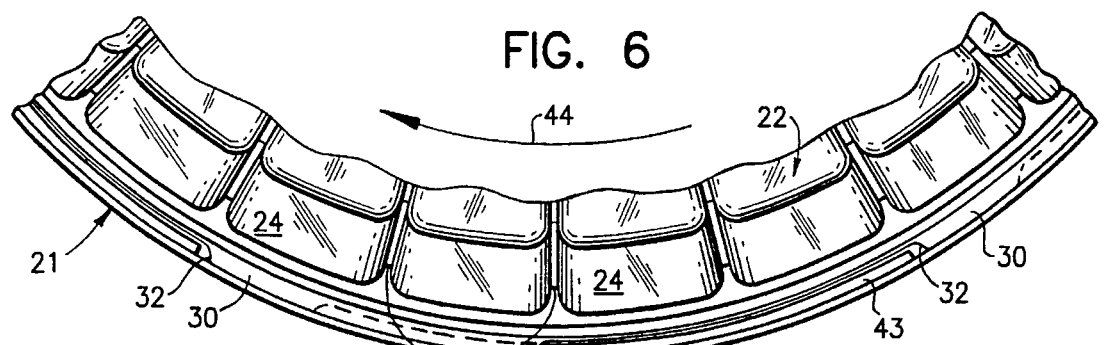
FIG. 6 is a top plan view partially broken away of the interlockable, reusable product holding and display container system of FIG. 2 depicted with the two components thereof telescopically interengaged with each other prior to being lockingly interengaged.
Figure 7:
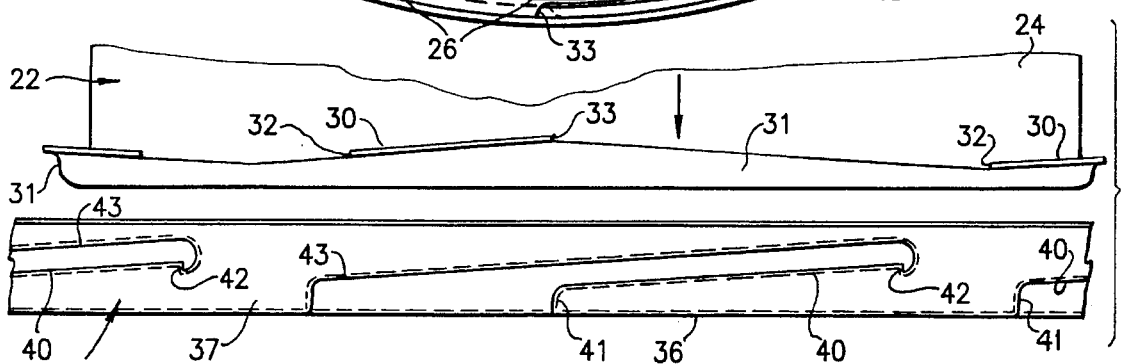
FIG. 7 is an exploded side elevation view, partially broken away, of the lockable, reusable product holding and display container system in position as depicted in FIG. 6.

In order to attain the desired trouble-free, easily attained locking interengagement of product display member 22 with base member 21, product display member 22 is telescopically advanced over the cake being covered until each of the radially extending flanges 30 of product display member 22 individually contacts a cam surface 43 of base member 21. This is best seen in FIGS. 2, 6, and 7.

Once each radially extending flange 30 of product display member 22 is supportingly retained on a cam surface 43 of base member 21, the secure, locked interengagement of these components is easily achieved by arcuately pivoting product display member 22 in the direction shown by arrow 44.

As product display member 22 is arcuately pivoted in the direction of arrow 44, each flange 30 slides along a cam surface 43 of base member 21, continuously advancing downwardly along the ramped, sloping surface of cam surface 43.

When radially extending flanges 30 have reached the lowermost edge of cam surface 43, the lowermost portion of the U-channel 31 of product display member 22 is in contact with base plate 36 of base member 22. Consequently, as product display member 22 is further arcuately pivoted relative to base member 22, each flange 30 advances away from cam surface 43 and into contact with flange engaging and locking ledge 40.

Figure 8:
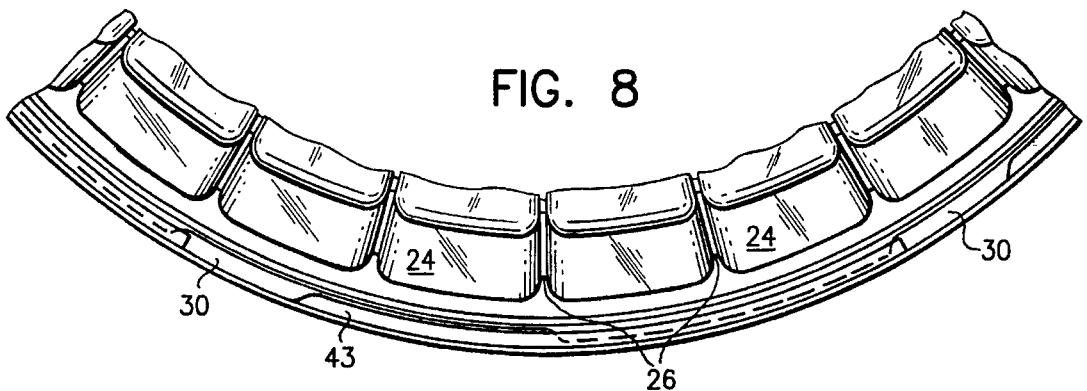
FIG. 8 is a top plan view, partially broken away, of the lockable, reusable product holding and display container system of FIG. 2 depicted with the dual components thereof in secure, locked, interengagement with each other.
Figure 9:
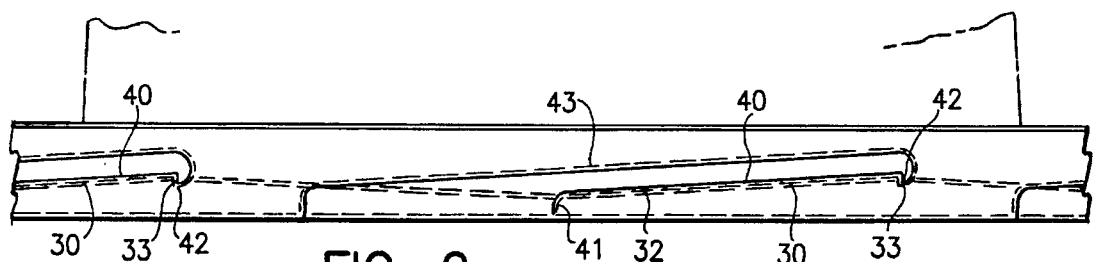
FIG. 9 is a side elevation view of the lockable, reusable product holding and display container system corresponding to the interlocked engaged position depicted in FIG. 8.

In the final stage of interlocked interengagement, each radially extending flange 30 of product display member 22 advances over abutment locking tab 42 into sliding contact with flange engaging and locking ledge 40. This arcuate movement continues until each leading edge 32 of each radially extending flange 30 contacts abutment stop 41 of flange engaging and locking ledge 40. The contacting engagement of leading edge 32 with abutment stop 41 prevents any further arcuate movement of product display member 22 relative to base member 21, as shown in FIGS. 8 and 9. Due to the construction of each radially extending flange 30 with a ramped slope angle identical to the slope angle of ledge 40, trailing edge 33 of flange 30 advances past locking tab 42 and moves into locking engagement therewith, preventing unwanted arcuate movement of product display member 22 relative to base member 21. Once this position has been reached, product holding display container system 20 of the present invention is in secure locked interengagement, with the cake retained therein completely closed, in the desired manner, without incurring any unwanted damage or disfigurement.

In order to gain access to the cake retained within product holding display and container system 20, disengagement and removal of product display member 22 from base member 21 must be repeatedly achieved. In general, prior art systems have typically been incapable of allowing consumers to easily separate the components thereof to gain access to the cake secured within such prior art systems. Most often, it is during this removal process that the cake surface is damaged or disfigured. In the present invention, product holding and displaying container system 20 provides quick and easy disengagement of product display member 22 from base member 21.

Product display member 22 is quickly and easily separated from base member 21 by merely rotating product display member 22 in the arcuate direction opposite from the direction employed for locking interengagement. During this removal process, as well as during the interlocking engagement process, tabs 38 may be employed for securely holding base member 21 and preventing unwanted rotation or movement of base member 21.

With base member 21 held or stabilized by tab member 38, if desired, housing 23 of product display member 22 is arcuately moved in the direction opposite from arrow 44, causing each trailing edge 33 of each radially extending flange 30 to contact a locking tab 42 of a ledge 40 and flex away from tab 42 so as to disengage each radially extending flange 30 from retained engagement with locking ledge 40. Then, as the arcuate movement continues, each radially extending flange 30 is brought into contact with a cam surface 43, causing housing 23 of product display member 22 to be moved upwardly as each radially extending flange 30 cammingly advances along ramped upwardly sloping surface 43. Once each flange 30 has been fully disengaged from locking ledge 40, the user is able to merely telescopically raise housing 23 of product display member 22 upwardly away from the cake retained therein.

As is apparent from the foregoing detailed disclosure, secure locked interengagement and rapid, easy, trouble-free disengagement of product display member 22 of base member 21 is easily attained by employing the teaching of the present invention. In this way, a product holding and displaying container system 20 is realized which is capable of securely retaining any desired food item, with the consumer being able to gain access to the food item with complete ease and in trouble-free operation. As a result, the present invention attains a thermoformed or vacuum formed plastic product holding and displaying container system which is inexpensive, easy and reliable to use, as well as being completely disposable when the product contained therein has been fully consumed.

In FIGS. 10–27, two alternate embodiments of product holding and displaying container system 20 of the present invention are depicted. In these embodiments, product holding and displaying container system 20 comprises a dual component container system 50 which is similar in construction and is depicted for use in securely retaining and displaying small or medium sized manufactured products for sale. In the embodiments shown, each product holding and displaying container system is capable of being placed on a hook or supporting rack for ease of display.

In addition, as with the embodiment of product holding and displaying container system 20 detailed above, both embodiments of container system 50 are constructed from thin plastic material using a thermoforming or vacuum forming process. In this way, the container systems are comparatively inexpensive to manufacture, completely reusable, and fully disposable, whenever desired by the consumer. Furthermore, recyclable plastic material can be employed, thereby attaining a product which is environmentally friendly.

In these embodiments, each container system 50 comprises a base member 51 and a product display member 52 cooperatively associated with base member 51. In the preferred constructions, each product display member 52 comprises a single, one-piece, integral construction which incorporates a substantially circular shaped support surface 53 to which housing 54 is integrally mounted, providing a retaining zone within which the product or products to be sold are retained. Depending upon the particular products for which container system 50 is constructed, housing 54 may be of any desired size and shape. The only requirement is that housing 54 extend from support surface 53, preferably defining therewith a fully opened portal zone for enabling the consumer to gain access to the products retained in housing 54 easily and conveniently. However, if desired, a portal covering member can be employed.

Product display member 52 also comprises a sidewall 55 which peripherally surrounds substantially circular shape support surface 53, extending substantially perpendicularly therefrom. In addition, a peripheral surrounding flange 56 extends substantially perpendicularly from sidewall 55.

In order to enable a consumer to readily see the products retained in housing 54, housing 54 is preferably formed from transparent plastic material. Since the entire construction of product display member 52 is preferably unitary, the entire product display member 52 is preferably formed from the same material, thereby enabling a consumer to readily see through the entire construction of product display member 52. In this way, a consumer is able to easily view all of the product or products retained in housing 54, as well as the area surrounding housing 54.

In order to provide the desired rapid, easily achieved, dependable and repeatable locking interengagement between product display member 52 and base member 51, product display member 52 incorporates a plurality of separate and independent radially extending locking ridges 60. As best seen in FIGS. 11, 12, 20 and 21, the plurality of substantially identical locking ridges 60 are formed in upstanding sidewall 55 radially extending therefrom for cooperative interengagement with base member 51. In the preferred construction, locking ridges 60 extend inwardly from sidewall 55.

Preferably, each locking ridge 60 comprises a ramped, sloping surface, with a leading edge 61 formed at the end of ridge 60 closest to flange 56 and a trailing edge 62 formed in sidewall 55 at the opposed end of ridge 60 which is furthest away from flange 56. In addition, ridge 60 also comprises a bottom surface 63. Leading edge 61, trailing edge 62, and bottom surface 63 are formed in sidewall 55 radially extending inwardly therefrom a distance equivalent to ridge 60. In the embodiment depicted, bottom surface 63 is co-planar with the surface of flange 56. Although this construction is preferred, these samples may be in different planes if desired.

In the preferred embodiment, eight independent, substantially identical, locking ridges 60, with leading edges 61, trailing edges 62, and bottom surfaces 63, are formed in sidewall 55 equally spaced from each other about sidewall 55, with each ridge 60 having an arcuate length of "L". Although this construction is preferred, any desired number of locking ridges 60 can be formed in sidewall 55 peripherally spaced thereabout without departing from the scope of the present invention. The only requirement in employing the teaching of the present invention is the formation of locking ridges 60 in a manner which will allow the telescopic interengagement of product display member 52 with base member 51 and the locking interconnection of product display member 52 with base member 51 by merely arcuately rotating product display member relative to base member 51.

In order to provide the cooperating, interlockingly sealing component for product display member 52, container system 50 incorporates base member 51. By referring to FIGS. 10, 13–14, 19, and 22–23, along with the following detailed disclosure, the construction and operation of base member 51 can best be understood.

Although variations exist in the construction of base member 51 as employed in the alternate embodiments detailed herein, the preferred construction of both embodiments are strikingly similar and incorporate numerous common features. In this regard, in both embodiments, base member 51 incorporates a substantially flat plate surface 70 which incorporates a substantially circular shape, upstanding sidewall flange 71 formed therein. In the embodiments depicted, sidewall flange 71 comprises a diameter less than the diameter of sidewall 55 of product display member 52 in order to enable sidewall 55 to be positioned in peripherally surrounding, juxtaposed spaced relationship with sidewall flange 71. Furthermore, sidewall flange 71 terminates with and is interconnected to substantially flat panel 72.

In order to provide base member 51 with locking means for cooperative, secure, holding interengagement with product display member 52, base member 51 incorporates a plurality of substantially identically shaped flange or ridge engaging and locking ledges 78 formed in sidewall flange 71. Each engaging and locking ledge 78 extends radially outwardly from sidewall flange 71 for cooperative interengagement with radially extending ridges 60 of product display member 52. In order to assure secure, rapid, easy interlocked interengagement of product display member 52 with base member 51, flange/ridge engaging and locking ledges 78 are spaced equidistantly apart from each other about the entire circumference of sidewall flange 71.

As detailed above, in the preferred construction of the present invention, eight separate and independent ridges 60 are formed in sidewall 55 of product display member 52. Consequently, separate and independent cooperating engaging and locking ledges 78 are formed in sidewall flange 71 of base member 51 for providing the desired secure interlocked cooperative interengagement between these two components.

In the preferred construction, each flange/ridge engaging and locking ledge 78 comprises a ramped, sloping surface extending from edge 77 adjacent panel 72 towards plate surface 70. At the terminating end of engaging and locking ledge 78 with surface plate 70, an abutment stop abutment 79 is formed. Abutment stop 79 is employed to control the arcuate rotation of product display member 52 relative to base member 51.

In addition, as is more fully detailed below, base member 51 also incorporates a cam or position-control surface 80 radially extending from sidewall flange 71 a distance substantially equivalent to the radially extending distance of engaging and locking ledge 78. Similarly, cam/position control surface 80 is positioned in cooperative aligned interengagement between adjacent engaging and locking ledges 78, equally spaced about sidewall flange 71 for cooperation with engaging and locking ledges 78.

In the preferred construction, cam/position control surface 80 terminates at one end with a locking tab 81 and, terminates at its opposed end with a guide surface 82 which extends from panel 72 to cam/position control surface 80. In order to assure ease of interengagement between product display member 52 and base member 51, each guide surface 82 is spaced away from edge 77 of engaging and locking ledge 78 by an arcuate distance "D", wherein distance "D" is greater than length "L" of locking ridge 60. In this way, each locking ridge 60 of product display member 52 is easily positioned in cooperating engagement with cam/position control surface 80 and ledge 78.

By referring to FIGS. 15–18 and 24–27, along with the following detailed disclosure, the rapid, easy, locking interengagement of product display member 52 with base member 51 can best be understood. In addition, as is evident from this disclosure, a trouble-free, easily employed locking container system 50 is realized which provides a dual component construction capable of secure interlocked engagement by telescopic overlying positioning and arcuate pivoted rotation therebetween. Furthermore, by constructing base member 51 and product display member 52 using a vacuum forming or thermoforming process, an inexpensively manufactured container system is attained which is fully reusable, if desired by the consumer, or completely disposable, as is any conventional prior art container for similar products. However, by employing the reusable feature of the present invention, added benefits are derived by a consumer purchasing products employing container system 50.

In order to attain the desired, easily achieved interlocked engagement of product display member 52 with base member 51, product display member 52 is telescopically advanced into engagement with base member 51 by aligning sidewall 55 of product display member 52 in peripheral surrounding engagement with sidewall flange 71 of base member 51. With substantially circular shaped sidewall 55 of product display member 52 comprising a diameter slightly greater than the diameter of substantially circular shaped sidewall flange 71 of base member 51, the overlying cooperative, peripherally surrounding, juxtaposed, spaced, aligned interengagement of sidewall 55 with sidewall flange 71 is easily attained.

In order to enable sidewall 55 of product display member 52 to peripherally surround sidewall flange 71 of base member 51 in the desired juxtaposed spaced manner, each locking ridge 60 of product display member 52 must be inserted between guide surface 82 and edge 77 of locking and engaging ledge 78. As detailed above, the arcuate distance "D" between guide surface 82 and edge 77 of engaging and locking ledge 78 is greater than the arcuate length "L" of locking ridge 60. Consequently, each locking ridge 60 is easily positioned between guide surface 82 and edge 77 in the desired manner.

When product display member 52 is placed in full telescopic interengagement with base member 51, bottom surfaces 63 of ridges 60 of product display member 52 is in contact with the cam or position control surfaces 80 formed about sidewall flange 71 of base member 51. This position is best seen in FIGS. 15, 17, 24 and 26.

Once this position is attained, product display member 52 is quickly and easily lockingly interengaged with base member 51 by merely arcuately rotating product display member 52 relative to base member 51 in the direction shown by arrow 85. By arcuately pivoting product display member 52 relative to base member 51 in this direction, each locking ridge 60 of product display member 52 advances towards one of the flange/ridge engaging and locking ledges 78. This movement is controlled by the sliding contact between bottom surfaces 63 and the plurality of cam or position control surfaces 80. Furthermore, as this arcuate movement continues, each locking ridge 60 engages with an adjacent engaging and locking ledge 78, causing sliding, controlled locking interengagement therebetween, until leading edge 61 of ridge 60 contacts abutment stop 79 of ledge 78.

Figure 18:
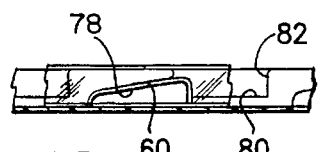
FIG. 18 is a side elevation view, partially in cross section and partially broken away, depicting the dual component product holding and display container system as shown in FIG. 10.
Figure 15:
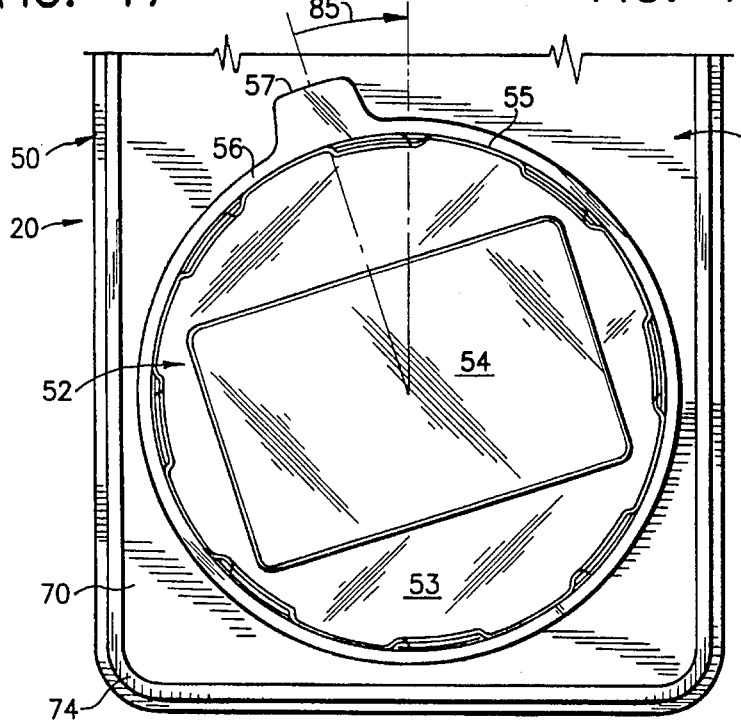
FIG. 15 is a front view of the product holding and display container system of FIG. 10 shown with the two components telescopically interengaged with each other prior to being securely interlocked with each other.
Figure 16:
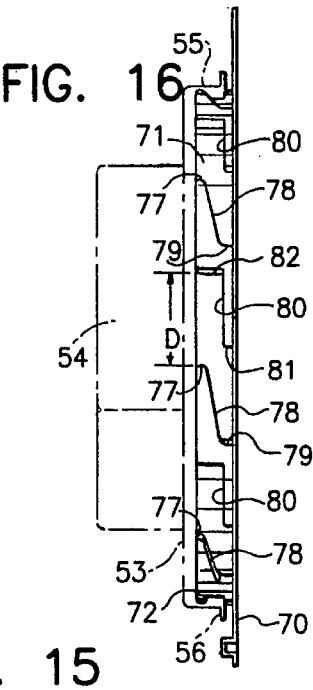
FIG. 16 is a side elevation view of the product holding and display container system of FIG. 15.

In the preferred embodiment, the arcuate distance between each abutment stop 79 of engaging and locking ledge 78 and locking tab 81 of cam or position control surface 80 comprises an arcuate distance slightly greater than the arcuate length "L" of locking ridge 60. As a result, when the leading edge 61 of ridge 60 contacts abutment stop 79, trailing edge 62 of ridge 60 becomes disengaged from cam or position control surface 80 and is brought into contact with locking tab 81. In this way, secure, locked interengagement of product display member 52 with base member 51 is provided. This position is best seen in FIGS. 18 and 27.

It has been found that by employing this construction, the movement of each trailing edge 62 of each locking ridge 60 from contact with cam or position control surface 80 into abutting contact with locking tab 81 produces a distinctive and recognizable audible "snapping" sound which has been found to be extremely desirable in audibly informing the consumer that locked interengagement of product display member 52 with base member 51 has been achieved. Although changes can be made in this construction to either enhance or eliminate this audible sound, it has been found that the embodiment detailed above with the audible sound is preferred.

Whenever a consumer wishes to open container system 50, to gain access to the product contained in housing 54, the consumer merely arcuately pivots product display member 52 relative to base member 51 in a direction opposite from arrow 85. As the arcuate pivoting force is applied to product display member 52, each edge 62 of each locking ridge 60 advances into contact with locking tab 81 of cam or position control surface 80 until edge 62 is disengaged from locking tab 81 and placed on cam or position control surface 80.

Thereafter, the further opening force applied to product display member 52 causes flange 56 of product display member 52 to slidingly advance on cam or position control surface 80, while each locking ridge 60 slidingly disengages from its associated engaging and locking ledge 78. This movement continues until edge 62 contacts guide surface 82, preventing any further arcuate movement. Then, product display member 52 is merely telescopically removed from base member 51 in order to gain the desired access to housing 54.

As is apparent from the foregoing detailed disclosure, product display member 52 and base member 51 are quickly and easily placed in either interlocked interengagement or disengaged from each other, with simplicity and ease. As a result, by employing the present invention, heretofore unattainable goals have been reached and a completely reusable container system is achieved which is inexpensive to manufacture and can be readily disposed of when further use is not desired. In addition, by employing recyclable materials for constructing container system 50, an environmentally friendly product is also attained.

As detailed above, the construction and operation of the two embodiments of product holding and displaying container system 20, as depicted in FIGS. 10–27, are substantially identical. However, in order to provide alternate features for a greater variety of products, the two embodiments presented herein as examples of the present invention preferably possess some different construction details.

In the embodiment of product holding and displaying container system 20 depicted in FIGS. 10–18, container system 50 is constructed to consist entirely of only two components, base member 51 and product container display member 52. In order to attain this goal, base rim/plate 70 of base member 51 of this embodiment comprises an enlarged, substantially planar, rectangular shape, having a size and shape consistent with the size and shape typically employed by cardboard support panels used in association with blister packages. In this way, base rim/plate 70 of base member 51 comprises a unitary, integral, one-piece construction designed for secure, locking interengagement with product display member 52, while also functioning as the support panel which allows product holding and displaying container system 20, and the product retained therein, to be displayed on any desired hook member in the retail outlet.

In order to assist and accommodate the use of base rim/plate 70 in this manner, aperture 73 is formed in base rim/plate 70 along the top edge thereof. Aperture 73 is employed to receive the hook and allow product holding and displaying container system 20 to be fully supported and displayed therefrom.

In addition, in order to possess the desired inherent strength and rigidity, base rim/plate 70 also incorporates an upstanding rib 74 formed therein and extending along substantially the entire outer peripheral surface of base rim/plate 70. By incorporating rib 74, improved strength and rigidity is imparted to base rim/plate 70, further assisting in the use of base rim/plate 70 as the supporting and holding panel member for container system 50.

Figure 10:
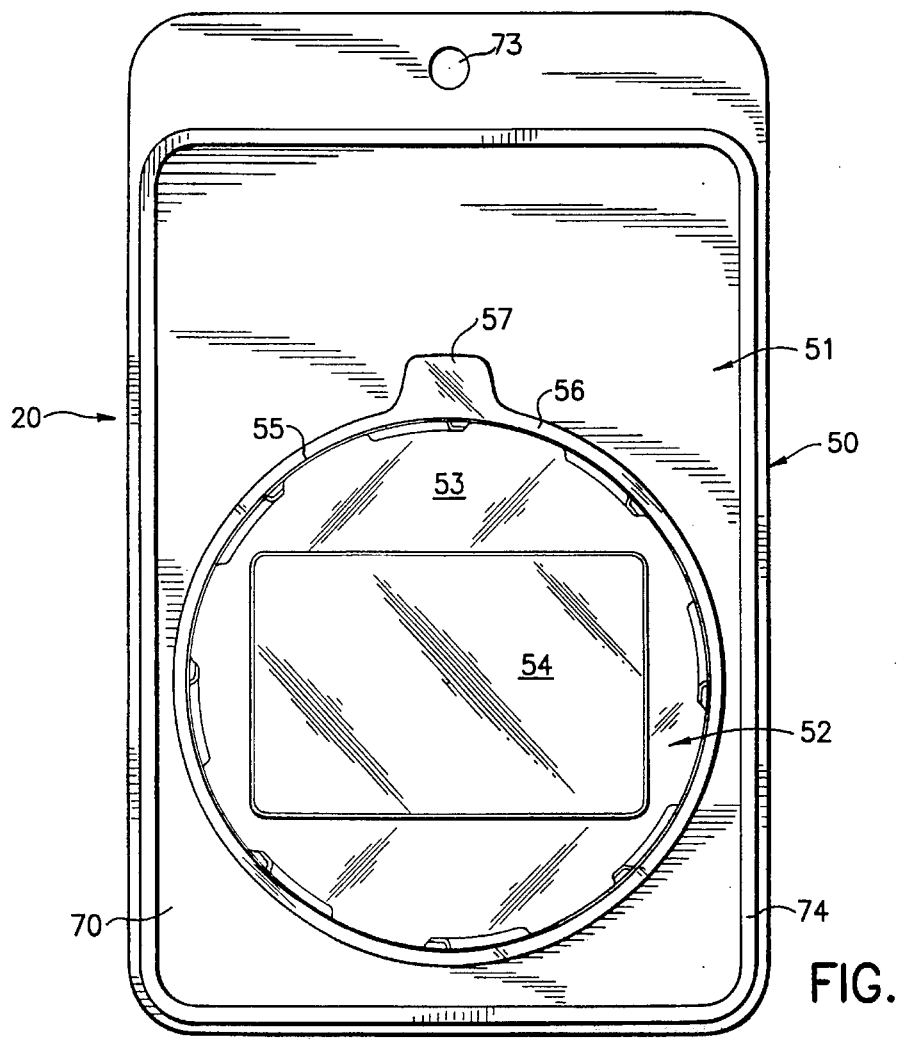
FIG. 10 is a front view of an alternate embodiment of the dual component, lockable, reusable product holding and display container system of this invention, depicting the two telescopically interengaged components in locked interengagement with each other.
Figure 11:
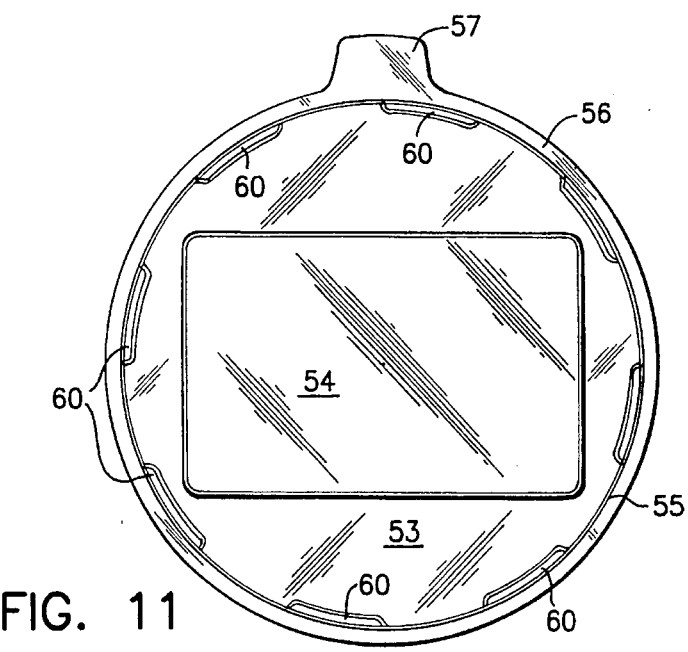
FIG. 11 is a front view of the product holding member of the container system of FIG. 10.
Figure 12:
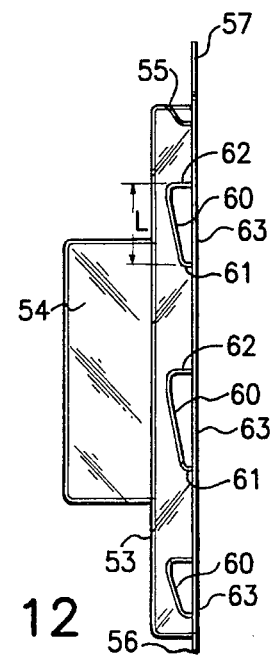
FIG. 12 is a side view of the product holding member of FIG. 11.
Figure 13:
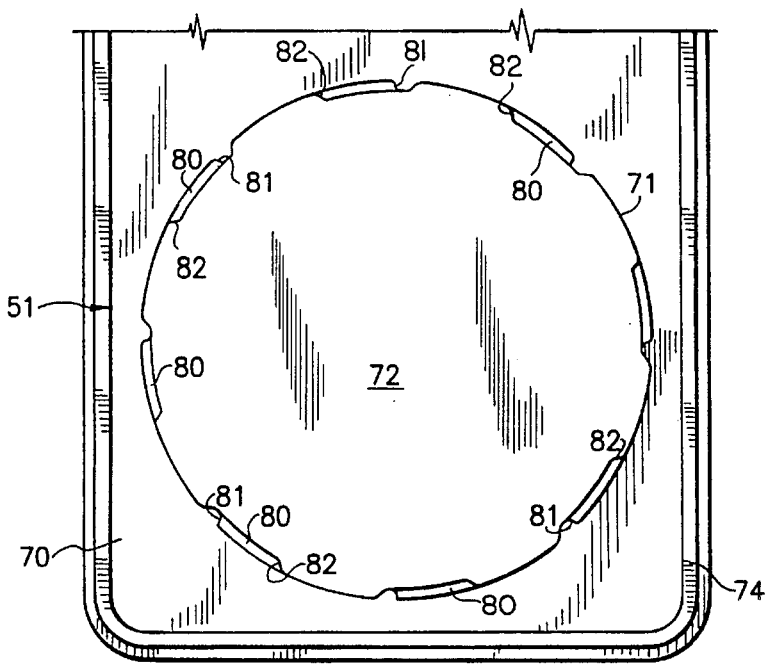
FIG. 13 is a front view, partially broken away, of the base member of the container system of FIG. 10.
Figure 14:
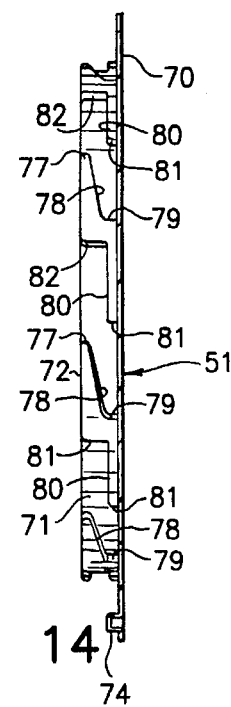
FIG. 14 is a side elevation view of the base member of FIG. 13.
Figure 17:
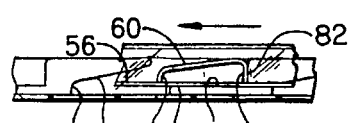
FIG. 17 is a side elevation view, partially in cross section and partially broken away, depicting the product holding and display container system as shown in FIG. 15.

An additional feature incorporated into this embodiment of product holding and displaying container system 20 is best seen in FIGS. 10 and 11. As depicted therein, product display member 52 incorporates an extending tab 57 formed along a portion of flange 56. Although tab 57 can be eliminated, if desired, the incorporation of tab 57 is preferred in order to provide a container system 50 which possesses inherent pilferage protection means.

By incorporating tab 57 and positioning 57 in overlying, juxtaposed, spaced, cooperating relationship with the top surface of base rim/plate 70, fastening means, such as tape, staples, etc. can be affixed between tab 57 and base rim/plate 70. In this way, assurance is provided that unwanted tampering or opening of container system 50 will not easily occur while container system 50 is on display at the retail outlet. Furthermore, if any tampering has occurred, the use of tab 57, with appropriate fastening means, will assure any other consumer will know whenever container system 50 has been improperly handled.

In the embodiment of the present invention depicted in FIGS. 19–27, product holding and displaying container system 20 incorporates container system 50 having the construction detailed above, which is constructed for cooperative, supporting, interconnected engagement with cardboard panel member 90. As a result, this embodiment of product holding and displaying container system 20 comprises three components, base member 51, product display member 52, both of which form container system 50, and cardboard panel member 90.

Cardboard panel member 90 comprises a generally conventional size and shape with aperture 91 formed therein in order to enable the entire product holding and displaying container system 20 to be easily displayed on a hook in any desired retail outlet. In a generally conventional manner, any desired printed information can be placed on either the front or rear surface of panel member 90.

In order to enable container system 50 to be securely retained by panel member 90, panel member 90 incorporates an enlarged, circular shaped portal 92, formed therein, having a diameter slightly greater than the diameter of sidewall flange 71 of base member 51. In this way, base member 51 is quickly and easily inserted into secure retention with panel member 90. In order to attain this mounted engagement, base member 51 is aligned with the rear surface of panel member 90 and upstanding sidewall flange 71 is passed through aperture 92 of panel member 90 until base rim/plate 70 comes into abutting contact with the rear surface of panel member 90. Once in this position, further axial movement of base member 51 relative to panel member 90 cannot be achieved and base member 90 is in secure, retained, interengagement therewith.

In this embodiment, base rim/plate 70 may comprise any desired size and shape which will enable base rim/plate 70 to be in secure, abutting, contacting interengagement with the rear surface of panel member 90. In the embodiment depicted in FIGS. 19–27, base rim/plate 70 comprises an enlarged, substantially circular shape, formed with a diameter which is large enough to provide the desired locking interengagement of base member 51 with panel member 90.

In addition, as best seen in FIGS. 22 and 23, base rim/plate 70 incorporates a tab portion 94 extending from the substantially circular base rim/plate 70. Furthermore, an upstanding rib 95 is formed in tab 94.

Figure 19:
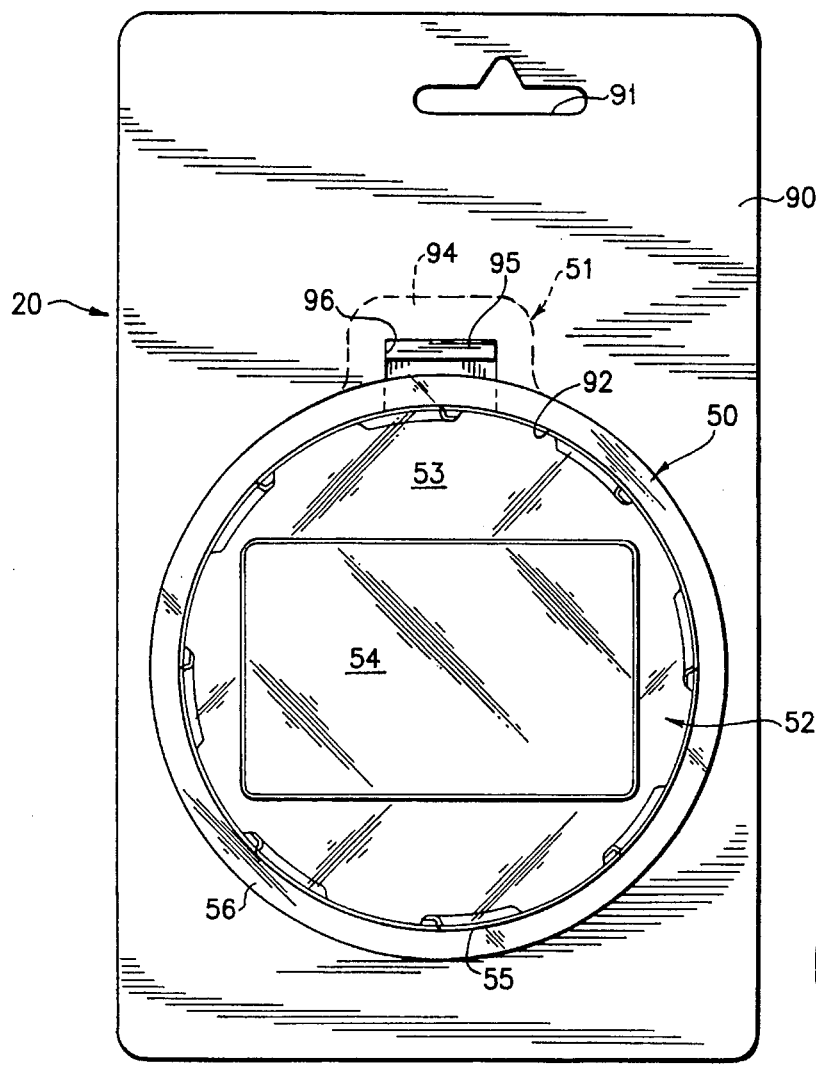
FIG. 19 is a front elevation view of a further alternate embodiment of the dual component, telescopically interengageable, lockable, reusable product holding and display container system of the present invention.
Figure 20:
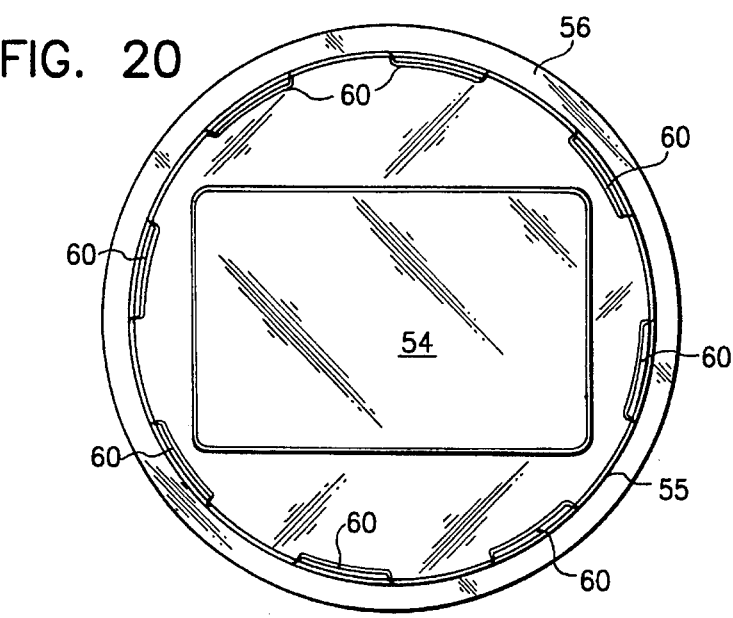
FIG. 20 is a front view of the product holding member of the container system of FIG. 19.
Figure 21:
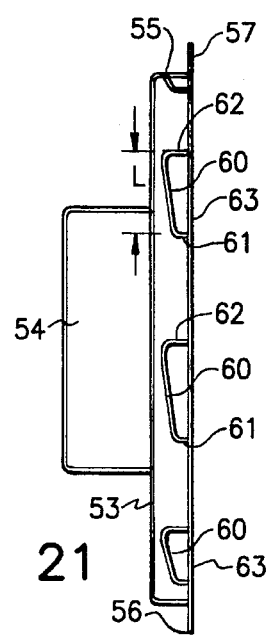
FIG. 21 is a side elevation view of tire product holding member of FIG. 20.

Panel member 90 incorporates a cutout zone 96 formed therein extending from substantially circular portal zone 92. As best seen in FIGS. 19 and 24, cutout zone 96 is constructed with a size and shape for receiving upstanding rib 95 of tab 94.

By employing this construction, the placement and operation of container system 50 is enhanced. Using this construction, tab 94 is positioned in alignment with cutout zone 96, with rib 95 extending from tab 94 in interengagement with cutout zone 96. As a result, the desired orientation of container system 50 is assured. Furthermore, by positioning rib 95 in secure interengagement with cutout zone 96, rotation or movement of container system 50 relative to panel member 90, prior to the desired opening of container system 50, is prevented.

In addition, this embodiment of product holding and displaying container system 20 also provides theft deterrent means for discouraging unwanted opening of container system 50 while on display in a retail outlet. In this embodiment, by applying fastening means between flange 56 and rib 95, such as adhesive tape or staples, unwanted removal of product display member 52 from base member 51 is achieved. Although complete removal is incapable of being prevented, this construction, like the previous construction, provides a deterrent against such unwanted actions. In addition, if any unwanted opening does occur, the fact that such product has been opened becomes evident to any other individual.

Another feature provided to consumers by manufacturers employing this embodiment of the present invention is the ability of the purchaser to be able to repeatedly reuse container system 5() for unused products, until all of the product have been consumed. When this embodiment of product holding and displaying container system 20 has been purchased, container system 50 is opened by disengaging product display member 52 from base member 51. In this way, the product retained in product display member 52 can be accessed. In addition, base member 51 can be easily removed from panel member 90 with panel member 90 being discarded when its use is no longer needed. If a plurality of products are retained for future use, base member 51 and product display member 52 are quickly and easily secured to each other, forming container system 50 which can be repeatedly used by the consumer until the entire product has been used and disposal of container system 50 is desired.

As is evident from the foregoing detailed discussions, in this embodiment of the present invention, sidewall flange 71 of base member 51 incorporates a vertical height which enables panel member 90 to be positioned between base rim/plate 70 and flange 56. In this way, cooperative, secure, supporting interengagement of this embodiment of container system 50 is easily achieved with panel member 90, as well as the repeated reuse of container system 50 after purchase.

As is evident from the foregoing disclosure, wherein the preferred alternate embodiments of the present invention have been fully and completely detailed, further alternate embodiments can be made without departing from the scope of the present invention. Consequently, it is to be understood that all such alternate embodiments are included within the scope of the present invention.

It will thus be seen that the objects set forth above, among those made apparent from the preceding description, are efficiently attained and, since certain changes may be made in carrying out the above process and in the article set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described our invention, what we claim is new and desire to secure by Letters Patent is:

1. The interlockable, reusable and disposable product holding and displaying container system, constructed for providing an easily employed system for holding and displaying products while being disposable when the products is consumed, said system comprising:

A. a base member comprising
  a. a base plate,
  b. a substantially circular upstanding first wall-defining member cooperatively associated with the base plate and extending substantially perpendicularly therefrom, and
  c. a plurality of separate, independent, first locking means
    1. formed in the first wall-defining member in juxtaposed, spaced, non-overlapping relationship, spaced substantially equidistant from each other about the entire substantially circular first wall-defining member, and
    2. comprising a plurality of separate and independent, radially extending engaging and locking ledges formed therein in a substantially circular array, with out of said engaging and locking ledges being spaced apart from each other a substantially equal distance, thereby forming zones therebetween free of any engaging and locking ledge, and cooperating with an abutment stop formed at one end thereof and a locking tab at the opposed end thereof, for controlling the arcuate movement of each radially extending surface of a product display member; and B. a product display member comprising
  a. a product holding zone formed therein for securely retaining a desired product,
  b. an entry portal cooperatively associated with the holding zone for providing access to the holding zone,
  c. support means peripherally surrounding the entry portal and cooperating therewith, and
  d. a second wall-defining member
    1. cooperatively associated with the support means,
    2. formed in a substantially circular-shape, peripherally surrounding the support means, and extending therefrom, and
    3. comprising a diameter constructed for cooperating, juxtaposed, facing relationship with the first wall-defining member of the base member; and
  e. a plurality of separate, independent, non-overlapping, second locking means
    1. formed in the substantially circular second wall-defining member in juxtaposed spaced equidistant relationship to each other and constructed for cooperating, interengagement with the first locking means formed in the substantially circular first wall-defining member of the base member, and
    2. comprising a plurality of independent, spaced, substantially equally dimensioned, surfaces radially extending from the substantially circular-shaped second wall-defining member, with each radially extending surface being spaced apart from adjacent radially extending surfaces a substantially equal distance, establishing a plurality of lock free zones therebetween;

whereby rapid, interconnected interlocking interengagement of the product display member with the base member is easily attained by positioning the product display member into telescopic engagement with the base member by advancing the second wall rotating the base member and product display member relative to each other, bringing the first and second locking means thereof into locked engagement.

2. The lockable, reusable and disposable product holding and displaying container system defined in claim 1, wherein said base member further comprises a plurality of radially extending guiding surfaces formed in the first wall-defining member cooperatively associated with the plurality of separate and independent radially extending engaging and locking ledges, said guiding surface being positioned for contacting and controllably directing the radially extending surfaces of the product display member when the product display member is initially engaged with the base member and controllably directing the radially extending surfaces of the product display member into contact with the engaging and locking ledges of the base member.

3. The lockable, reusable and disposable product holding and displaying container system defined in claim 1, wherein said entry portal of the product display member is further defined as being formed by a substantially cylindrically shaped upstanding wall member terminating at one end thereof with a substantially flat end closing panel, establishing a holding zone therein for peripherally surrounding and retaining any desired product, and said support means is further defined as comprising a surface extending between the substantially cylindrically shaped wall member and the second wall-defining member establishing a substantially circular shaped, continuous surface defining the entry portal to said housing.

4. The lockable, reusable and disposable product holding and displaying container system defined in claim 3, wherein said second locking means of the product display member is further defined as comprising a plurality of radially extending flanges formed about said entry portal in extending, interconnected engagement with the second wall defining member.

5. The lockable, reusable and disposable product holding and displaying member defined in claim 1, wherein said radially extending locking ledges of the base member are further defined as comprising an abutment stop formed at one end of said ledge, positioned for cooperatingly engaging a leading edge of the radially extending surface of the product display member, defining an arcuate rotation stop position of the product display member with the base member.

6. The lockable, reusable and disposable product holding and displaying member defined in claim 5, wherein each of said plurality of radially extending surfaces forming the second locking means of the product display member are further defined as comprising a fixed length formed along the substantially circular shaped second wall-defining member, radially extending therefrom for engagement with the plurality of separate and independent locking ledges of the base member, and each locking ledge is further defined as comprising a locking tab formed at the end thereof opposite said abutment stop and spaced away therefrom a distance greater than the fixed length of the second locking means, whereby each of said second locking means is lockingly engaged with a corresponding locking ledge when the product display member and the base member are fully interengaged.

7. The lockable, reusable and disposable product holding and displaying member defined in claim 5, wherein said base plate comprises an enlarged panel for supporting the product display member and any product associated therewith, enabling an entire assembly to be easily retained on any desired support system for display and sale.

8. The lockable, reusable and disposable product holding and displaying container system defined in claim 1, wherein the base plate of the base member is further defined as comprising an enlarged support panel for use in holding and displaying the entire container system for sale.

9. The lockable, reusable and disposable product holding and displaying container system defined in claim 1, wherein said system further comprises C. a support panel constructed for
  a. cooperating, supporting, holding engagement with the base member and the product display member for retaining said member when desired, and
  b. being disengaged from the base member and product display member, and discarded when supporting, holding engagement thereof is unnecessary.

10. The lockable, reusable and disposable product holding and displaying container system defined in claim 9, wherein said support panel comprises an enlarged aperture constructed to receive the flange of the base member and contact the base plate on one surface thereof with the opposed surface contacting the product display member, whereby said panel is sandwiched between the base member and the product display member for secure, supporting retained engagement therewith.

11. An interlockable, reusable and disposable product holding and displaying container system constructed for supportingly retaining multi-layered frosted/decorated bakery goods, said system comprising A. a base member comprising
  a. a substantially circular shaped base plate,
  b. a substantially circular, upstanding sidewall peripherally surrounding the base plate and extending substantially perpendicularly therefrom, and
  c. a plurality of separate, independent, radially extending locking members formed in the sidewall in juxtaposed, spaced, non-overlapping relationship to each other with each of said locking members being spaced substantially equidistant from each other about an entire substantially circular surface of said sidewall; and B. a product display member comprising
  a. a substantially cylindrically shaped first wall member constructed for peripherally surrounding the product to be retained therein,
  b. a panel member integrally attached to a first terminating end of the cylindrically shaped first wall member for closing said first end of the cylindrical first wall and establishing a product holding zone therein,
  c. an entry portal defined by a second end of time cylindrically shaped first wall and cooperatively associated with the holding zone for providing access to said holding zone,
  d. a second wall-defining member
    1. cooperatively associated with the cylindrical first wall member,
    2. formed in peripherally surrounding, co-axially aligned relationship with the cylindrical first wall member and
    3. having a diameter greater than a diameter of the first wall member with the diameter of the second wall-defining member being constructed for cooperating, juxtaposed, facing relationship with the sidewall of the base plate, and
  e. locking means comprising a plurality of separate and independent, non-overlapping, radially extending flanges formed in a substantially circular surface of said second wall-defining member in juxtaposed, spaced, equidistant relationship to each other, and constructed for cooperating, interengagement with the locking members of the base member, and
  f. a U-shaped channel formed peripherally surrounding the entry portal with a first side of said U-shaped channel being integrally connected with the cylindrically shaped first wall member and a second side of said U-shaped channel being formed by the substantially circular second wall-defining member peripherally surrounding the first wall member;

whereby an easily employed, easily used, engaging and disengaging container system is attained for use with any desired product for ease of closing and opening said container system by positioning the product display member into telescopic engagement with the base member by advancing the a second wall member into juxtaposed, spaced, parallel relationship with the sidewall and then rotating the base member and product display member relative to each other, bringing the locking members of the sidewall and the flanges of the second wall-defining member into locked engagement.

12. The interlockable, reusable and disposable product holding and displaying container system defined in claim 11, wherein said radially extending flanges forming the locking means of the product display member are further defined as being formed along a second leg of said U-shaped channel outwardly extending therefrom in juxtaposed, spaced relationship with each other.

13. The interlockable, reusable and disposable product holding and displaying container system defined in claim 12, wherein said separate, independent locking members of said base member are further defined as comprising radially extending flange engaging and locking ledges formed in the sidewall and extending inwardly therefrom for cooperating interlocking interengagement with said radially extending flanges of said product display member.

14. The interlockable, reusable and disposable product holding and displaying container system defined in claim 13, wherein each of said flange engaging and locking ledges incorporate an abutment stop formed at one end thereof and an abutment locking tab formed at the opposed end thereof thereby controlling the movement of said radially extending flanges of the product display member therewith, while also providing secure, locked, interengagement of said flanges therein when full interengagement has occurred.

15. The interlockable, reusable and disposable product holding and displaying container system defined in claim 14, wherein said base member further comprises a plurality of separate and independent cam surfaces formed in said sidewall, radially extending inwardly therefrom in juxtaposed, spaced, cooperating relationship with said flange engaging and locking ledges for guiding the flanges of said product display member towards an adjacent flange engaging and locking ledge as said product display member is arcuately rotated relative to said base member.

16. The interlockable, reusable and disposable product holding and displaying container system defined in claim 15, wherein said base member further comprises radially extending tab portions formed along a terminating edge of said substantially circular sidewall for providing holding means for stabilizing the base member during opening and closing of said container system.

17. The interlockable, reusable and disposable product holding and displaying container system defined in claim 11, wherein said base plate is further defined as comprising:
1. a plurality of circular grooves integrally formed therein for imparting strength and rigidity thereto, and
2. an upstanding substantially circular stiffening ring integrally formed therein having a diameter slightly greater than the diameter of the product being retained thereon.

18. An interlockable, reusable and disposable product holding and displaying container system constructed for being self supporting while retaining any desired product, said system comprising
A. a base member comprising
  a. a base plate,
  b. a substantially circular, upstanding first flange extending from said base plate substantially perpendicularly thereto, and
  c. a plurality of separate, independent, radially extending first locking members formed in the first flange in juxtaposed, spaced, non-overlapping relationship to each other with each of said first locking members being spaced substantially equidistant from each other about an entire substantially circular surface of said first flange, and each radially extending locking member comprising
    1. a radially extending engaging and locking ledge formed in the flange member, and
    2. an abutment stop formed at one end thereof and a locking tab at the opposed end thereof for controlling the movement of cooperating members; and
B. a product display member comprising
  a. a substantially circular shaped panel member,
  b. a product containing housing integrally attached to said panel, forming therewith a product holding zone,
  c. an entry portal formed at a junction between the housing and the panel member, providing access to said housing,
  d. a substantially circular shaped second flange extended from said panel member and comprising a diameter similar to a diameter of the first flange of the base member for providing juxtaposed, spaced, cooperating relationship therebetween, and
  e. second locking means comprising a plurality of separate and independent, non-overlapping, radially extending surfaces formed in a substantially circular surface of said second flange in juxtaposed, spaced, equidistant relationship to each other, defining a diameter constructed for cooperating, interengagement with the first locking members of the base member;
whereby an easily employed, easily used, engaging and disengaging container system is attained for holding any desired product and enabling the container system to be easily opened and closed whenever desired.

19. The interlockable, reusable and disposable product holding and displaying container system defined in claim 18, wherein said radially extending surfaces forming the locking means of the product display member are further defined as extending inwardly from the flange with each radially extending surface being ramped with the same slope angle, and having a leading edge and a trailing edge.

20. The interlockable, reusable and disposable product holding and displaying container system defined in claim 19, wherein said separate, independent locking members of said base member are further defined as comprising radially extending engaging and locking ledges formed in the flange member and extending outwardly therefrom for cooperating interlocking interengagement with said radially extending surfaces of said product display member.

21. The interlockable, reusable and disposable product holding and displaying container system defined in claim 20, wherein each of said engaging and locking ledges comprise ramped, sloping surfaces and incorporate an abutment locking tab formed at an opposed end thereof, thereby controlling the movement of said radially extending surface of the product display member, while also providing secure, locked, interengagement of said surface therewith when full engagement has occurred.

22. The interlockable, reusable and disposable product holding and displaying container system defined in claim 21, wherein said base member further comprises a plurality of separate and independent cam surfaces formed in said flange member radially extending outwardly therefrom in juxtaposed, spaced, cooperating relationship with said engaging and locking ledges for guiding the locking surfaces of said product display member towards an adjacent engaging and locking ledge as said product display member is arcuately rotated relative to said base member.

23. The interlockable, reusable and disposable product holding and displaying container system defined in claim 22, wherein said base member further comprises guide means formed along one end of said cam surface for providing guiding engagement of the product display member with the base member when desired.

24. A method for providing an interlockable, reusable and disposable product holding and displaying container system comprising the steps of
A. selecting a first sheet of thin plastic material;
B. placing said first sheet of thin plastic material in a thermoforming die;
C. forming a base member from said first sheet of thin plastic material using said thermoforming die, with said base member comprising
  a. a base plate,
  b. a substantially circular upstanding flange cooperatively associated with the base plate and extending substantially perpendicularly therefrom, and
  c. a plurality of separate, independent locking members formed in the flange in juxtaposed, spaced, non-overlapping relationship, spaced substantially equidistant from each other about an entire substantially circular flange surface with each locking member comprising an abutment stop formed at one end thereof and a locking tab at the opposed end thereof for controlling the movement of cooperating members;
D. selecting a second sheet of thin plastic material;
E. placing said second sheet of said thin plastic material in a thermoforming die; and
F. forming a product display member from said second sheet of thin plastic material using said thermoforming die with said product display member comprising a. a product holding zone formed therein for securely retaining desired product,
b. an entry portal cooperatively associated with the holding zone for providing access to the holding zone,
c. support means peripherally surrounding the entry portal and cooperating therewith, and
d. locking means
   1. cooperatively associated with the support means,
   2. positioned in a substantially circular-shaped array peripherally surrounding the support means,
   3. comprising a plurality of independent, non-overlapping, outwardly extending surfaces formed in a substantially circular array in juxtaposed spaced equidistant relationship to each other, and defining a diameter constructed for cooperating, interengagement with the locking members associated with the circular flange of the base member;

whereby an easily employed, interlockable, reusable and freely disposable product holding and displaying container system is manufactured inexpensively while attaining a completely disposable system capable of being easily reused during the useful life of the product or products retained therein.

25. An interlockable, reusable and disposable product holding and displaying container system constructed for providing an easily employed system for holding and displaying products while being disposable when the product is consumed, said system comprising:

A. a base member comprising
   a. a base plate,
   b. a substantially circular upstanding wall-defining flange cooperatively associated with the base plate and extending substantially perpendicularly therefrom, and
   c. at least three, separate and independent first locking means
      1. formed in the flange in juxtaposed, spaced, non-overlapping relationship to each other spaced substantially equidistant from each other about the entire substantially circular, wall-defining flange,
      2. each comprising an abutment stop formed at one end thereof and a locking tab formed at the opposed end thereof for controlling the arcuate movement of cooperating members, and B. a product display member comprising
   a. a product holding zone formed therein for securely retaining a desired product,
   b. an entry portal cooperatively associated with the holding zone for providing access to the holding zone,
   c. support means
      1. peripherally surrounding the entry portal and cooperating therewith, and
      2. comprising a substantially circular-shaped flange constructed for being positioned between a disengaged position and engaged position wherein the substantially circular flange is in cooperating, juxtaposed, spaced, facing, parallel, aligned, relationship with the wall-defining flange of the base member, and
   d. at least three independent, non-overlapping, locking and engaging surfaces formed in the substantially circular flange in juxtaposed spaced equidistant relationship to each other, defining a diameter with said flange which is constructed for cooperating, interengagement with the first locking means formed in the circular wall-defining flange of the base member;

whereby rapid, interconnected interlocking interengagement of the product display member with the base member is easily attained by first positioning the product display member into telescopic engagement with the base member and then rotating the base member and product display member relative to each other bringing the first locking means and the locking and engaging surfaces into locked engagement.

* * * * *